(12) United States Patent
Tenghamn et al.

(10) Patent No.: US 7,446,535 B1
(45) Date of Patent: Nov. 4, 2008

(54) ELECTRODE STRUCTURE AND STREAMER MADE THEREWITH FOR MARINE ELECTROMAGNETIC SURVEYING

(75) Inventors: Stig Rune Lennart Tenghamn, Katy, TX (US); Ulf Peter Lindqvist, Segeltorp (SE)

(73) Assignee: PGS Geopysical AS, Lysaker (NO)

( * ) Notice: Subject to any disclaimer, the term of this patent is extended or adjusted under 35 U.S.C. 154(b) by 0 days.

(21) Appl. No.: 11/903,462

(22) Filed: Sep. 21, 2007

(51) Int. Cl.
*G01V 3/00* (2006.01)
*H02G 15/00* (2006.01)

(52) U.S. Cl. .................. 324/365; 324/337; 174/74 A; 174/74 R; 174/101.5; 367/177

(58) Field of Classification Search ......... 324/330–331, 324/337, 365; 174/70 R, 74 A, 74 R, 75 R, 174/98, 99 R, 101, 102 R, 107, 110 SR, 110 N, 174/110 PM, 110 D, 122 R, 124 R, 124 G; 367/177
See application file for complete search history.

(56) References Cited

U.S. PATENT DOCUMENTS

| | | |
|---|---|---|
| 6,104,357 A | 8/2000 | Brage |
| 6,914,433 B2 | 7/2005 | Wright et al. |
| 7,142,481 B1 | 11/2006 | Metzbower et al. |
| 2004/0232917 A1 | 11/2004 | Wright et al. |
| 2006/0238200 A1 | 10/2006 | Johnstad |
| 2007/0229083 A1* | 10/2007 | Tenghamn et al. .......... 324/347 |

\* cited by examiner

*Primary Examiner*—Bot LeDynh
(74) *Attorney, Agent, or Firm*—E. Eugene Thigpen; Richard A. Fagin

(57) ABSTRACT

An electromagnetic sensor cable includes at least one strength member configured to be coupled to a vessel for towing in a body of water and extending along the length of the cable. A jacket covers the strength member and extends along the length of the cable. At least one electrode mounting sleeve is disposed along the jacket and is coupled at its longitudinal ends to one end of a segment of the jacket. The longitudinal ends of the sleeve are configured to mate with a corresponding end of the jacket segment. The sleeve includes a passage therethrough for the at least one strength member. The sleeve includes a mounting surface for a fiber electrode material thereon disposed between the longitudinal ends of the sleeve. At least one electrical contact surface is disposed on the mounting surface. Electrically conductive fiber electrode material is disposed on the mounting surface and is in electrical contact with the electrical contact surface.

22 Claims, 2 Drawing Sheets

ELECTRODE STRUCTURE AND STREAMER MADE THEREWITH FOR MARINE ELECTROMAGNETIC SURVEYING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic surveying. More specifically, the invention relates to structures for electrodes used in streamers forming part of a marine electromagnetic survey system.

2. Background Art

Electromagnetic geophysical surveying of the Earth's subsurface includes "controlled source" and "natural source" electromagnetic surveying. Controlled source electromagnetic surveying includes imparting an electric field or a magnetic field into subsurface Earth formations, such formations being below the sea floor in marine surveys, and measuring electric field amplitude and/or amplitude of magnetic fields by measuring voltage differences induced in electrodes, antennas and/or interrogating magnetometers disposed at the Earth's surface, or on or above the sea floor. The electric and/or magnetic fields are induced in response to the electric field and/or magnetic field imparted into the Earth's subsurface, and inferences about the spatial distribution of conductivity of the Earth's subsurface are made from recordings of the induced electric and/or magnetic fields.

Natural source electromagnetic surveying includes deploying multi-component ocean bottom receiver stations and by taking the ratio of perpendicular field components, one can eliminate the need to know characteristics of the natural source.

Controlled source electromagnetic surveying known in the art includes imparting alternating electric current into the subsurface formations. The alternating current has one or more selected frequencies. Such surveying is known as frequency domain controlled source electromagnetic (f-CSEM) surveying. Another technique for electromagnetic surveying of subsurface Earth formations known in the art is transient controlled source electromagnetic surveying (t-CSEM). In t-CSEM, electric current is imparted into the Earth at the Earth's surface (or sea floor), in a manner similar to f-CSEM. The electric current may be direct current (DC). At a selected time, the electric current is switched off, switched on, or has its polarity changed, and induced voltages and/or magnetic fields are measured, typically with respect to time over a selected time interval, at the Earth's surface or water surface. Alternative switching techniques are possible. Structure of the subsurface is inferred by the time distribution of the induced voltages and/or magnetic fields. For example, U.S. Patent Application Publication No. 2004/232917 and U.S. Pat. No. 6,914,433 Detection of subsurface resistivity contrasts with application to location of fluids (Wright et al.) describe a method of mapping subsurface resistivity contrasts by making multichannel transient electromagnetic (MTEM) measurements on or near the Earth's surface using at least one source, receiving means for measuring the system response and at least one receiver for measuring the resultant earth response. All signals from each source-receiver pair are processed to recover the corresponding electromagnetic impulse response of the earth and such impulse responses, or any transformation of such impulse responses, are displayed to create a subsurface representation of resistivity contrasts. The system and method enable subsurface fluid deposits to be located and identified and the movement of such fluids to be monitored.

The above methods for f-CSEM and t-CSEM have been adapted for use in marine environments. Cable based sensors have been devised for detecting electric and/or magnetic field signals resulting from imparting electric and/or magnetic fields into formations below the bottom of a body of water. See, for example, U.S. Patent Application Publication No. 2006/0238200 filed by Johnstad. The amplitude of the signals detected by electrodes on cables resulting from the imparted electric field, such as described in the Johnstad publication, may be on the order of fractions of a nanovolt. Accordingly, a particular consideration in the design and implementation of electromagnetic survey receiver systems is reducing the amount of noise that may be induced in the signals detected by the various sensing elements in the receiver system. An important part of reducing noise in such systems is careful attention to the design of electrodes used to measure voltages related to the amplitude of electromagnetic fields.

There is a need for improved voltage measuring electrodes used with electromagnetic survey systems.

SUMMARY OF THE INVENTION

An electromagnetic sensor cable according to one aspect of the invention includes at least one strength member configured to be coupled to a vessel for towing in a body of water and extending along the length of the cable. A jacket covers the strength member and extends along the length of the cable. At least one electrode mounting sleeve is disposed along the jacket and is coupled at its longitudinal ends to one end of a segment of the jacket. The longitudinal ends of the sleeve are configured to mate with a corresponding end of the jacket segment. The sleeve includes a passage therethrough for the at least one strength member. The sleeve includes a mounting surface for a fiber electrode material thereon disposed between the longitudinal ends of the sleeve. At least one electrical contact surface is disposed on the mounting surface. Electrically conductive fiber electrode material is disposed on the mounting surface and is in electrical contact with the electrical contact surface.

An electromagnetic sensor cable according to another aspect of the invention includes at least one strength member configured to be coupled to a vessel for towing in a body of water and extending along the length of the cable. A jacket covers the strength member and extends along the length of the cable. A plurality of electrode mounting sleeves are disposed at spaced apart locations along the jacket. Each sleeve is coupled at its longitudinal ends to one end of a segment of the jacket. The longitudinal ends of each sleeve are configured to mate with a corresponding end of the jacket segment. Each sleeve includes a passage therethrough for the at least one strength member. Each sleeve includes a mounting surface for a fiber electrode material thereon disposed between the longitudinal ends of each sleeve. The sleeve includes at least one electrical contact surface disposed on the mounting surface of each sleeve. An electrically conductive fiber electrode material is disposed on the mounting surface of each sleeve and in electrical contact with the electrical contact surface of each sleeve.

Other aspects and advantages of the invention will be apparent from the following description and the appended claims.

DETAILED DESCRIPTION

Figure 1:
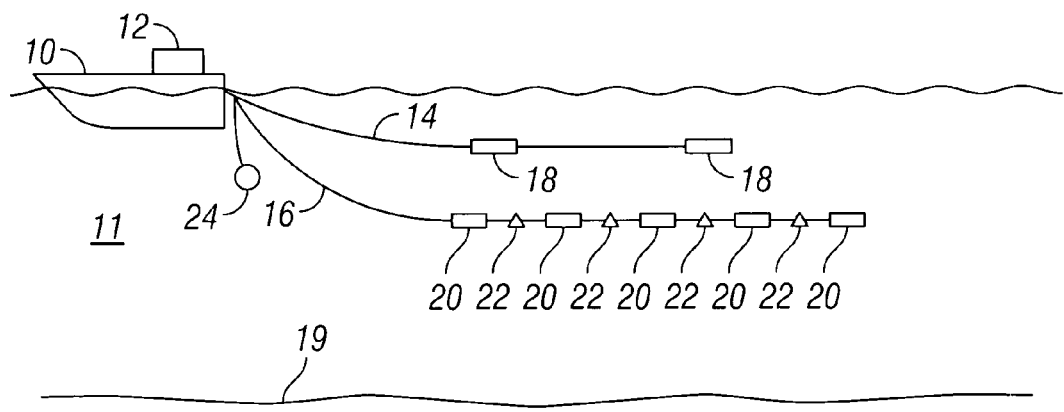
FIG. 1 shows an example marine electromagnetic survey system having a towed sensor cable.

An example marine electromagnetic survey system is shown schematically in FIG. 1. A survey vessel 10 moves along the surface of a body of water 11 such as a lake or the ocean. The vessel 10 may include equipment, shown generally at 12 and referred to for convenience as a "recording system" that includes devices (none shown separately) for applying electric current to source electrodes 18 and/or other devices on a source cable 14 towed by the vessel 10, for navigating the vessel 10 and determining geodetic position of the vessel 10 and components towed by the vessel 10 in the water 11, and for recording signals detected by one or more sensors on a sensor cable 16.

The source cable 14 in the present example can include two source electrodes 18 disposed at spaced apart positions along the source cable 14. At selected times certain of the equipment (not shown separately) in the recording system 12 conducts electric current across the source electrodes 18. The time varying component of such electric current produces an electromagnetic field that propagates through the water 11 and into the formations below the water bottom 19. The particular type of current conducted across the source electrodes 18 may be single- or multi-frequency alternating current, or various forms of switched direct current, such that either or both transient and frequency domain controlled source electromagnetic surveying may be performed. It should also be understood that the arrangement of the source electrodes 18 shown in FIG. 1, referred to as a horizontal electric dipole transmitter antenna, is not the only type of electromagnetic transmitter antenna that may be used with the invention. The source cable 14 could also include, in addition to or in substitution of the horizontal electric dipole transmitter antenna shown in FIG. 1, any one or more of a vertical electric dipole antenna, and horizontal or vertical magnetic dipole antenna (current loop). Accordingly, the electromagnetic field source antenna configuration shown in FIG. 1 is not intended to limit the scope of the present invention. If electrodes are used in the source cable 14, as shown in FIG. 1, such electrodes may in some examples be configured as will be explained further below with reference to receiver electrodes 20 on a sensor cable 16.

In the example of FIG. 1, the vessel 10 also tows at least one sensor cable 16. The sensor cable 16 can include at least one pair, and preferably a plurality of pairs, of receiver electrodes 20 disposed at spaced apart positions along the sensor cable 16. An electric field resulting from interaction of the induced electromagnetic field with the formations below the water bottom 19 can induce voltages across the pairs of receiver electrodes 20, and such voltages may be detected by any form or voltage measuring circuit (not shown) known in the art. Such voltage measuring circuits (not shown) may be disposed in the sensor cable 16 and/or in the recording system 12.

The sensor cable 16 in some examples may also include seismic sensors, such as hydrophones and/or, shown generally at 22, disposed at spaced apart locations along the sensor cable 16. For such examples where the sensor cable 16 includes seismic sensors, the survey vessel 10 or another vessel may tow a seismic energy source 24 such as an air gun or array of air guns. The seismic energy source 24 may be actuated at selected times by certain equipment (not shown separately) in the recording system 12 and signals detected by the seismic sensors 22 may be recorded by a signal recording device (not shown separately) in the recording system 12. During survey operations, seismic signals may be acquired substantially contemporaneously with electromagnetic signals detected by the receiver electrodes 20 or may be acquired at other times.

It should also be understood that the example system of FIG. 1 including only one sensor cable 16 is only shown to illustrate how to make and use a sensor cable according to various aspects of the invention. A sensor cable and electrode configuration according to the various aspects of the invention may be used with acquisition systems that include a plurality of laterally spaced apart sensors cables towed by the survey vessel 10 and/or another vessel in a selected configuration to provide "in line" and "cross line" electromagnetic and/or seismic signals. Accordingly, the number of sensor cables and their particular geometric configuration are not limits on the scope of the present invention.

Figure 2:
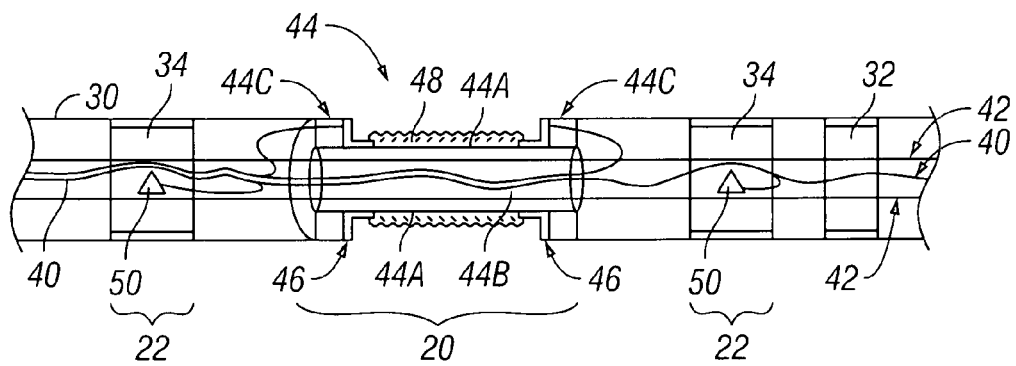
FIG. 2 shows an example electrode structure for the sensor cable shown in FIG. 1.

A more detailed view of a portion of the sensor cable 16, in particular configuration of one of the electrodes, will now be explained with reference to FIG. 2. The sensor cable 16 may include one or more strength members 42 extending along substantially the entire length of the sensor cable 16. The strength members may be made from fiber such as one sold under the trademark VECTRAN, which is registered trademark of Hoescht Celanese Corp., New York, N.Y. The strength members 42 are configured to bear the axial stress caused by towing the sensor cable 16 through the water (11 in FIG. 1). Sensor spacers 34 made from rigid plastic or other material may be affixed to the one or more strength members 42 at spaced apart locations. A seismic sensor 50 may be disposed in a suitable opening or holder (not shown separately) in each of the sensor spacers 34. Signal connection between each seismic sensor 50 and a wire bundle or harness 40 may be made proximate to each seismic sensor 50. Such signal connection may be electrical or optical depending on the type of seismic sensor used in any particular example. One or more buoyancy spacers 32, typically made from foamed polypropylene, may be disposed along the cable 16 at spacer apart positions. The buoyancy spacers 32 may be provided so that the cable 16 has a selected overall density, typically so that the sensor cable 16 is substantially neutrally buoyant in the water (11 in FIG. 1). The exterior of the sensor cable 16 may be covered with a jacket 30. The jacket is typically made from a chemically resistant, acoustically transparent material such as polyurethane. The void space inside the jacket 30 not occupied by the foregoing elements is typically filled with a liquid such as oil or kerosene, or a gel or gel-like material. Such configuration for a sensor cable including seismic sensors, sensor spacers, buoyancy spacers, strength members and a harness is well known in the art. See, for example, U.S. patent application Ser. No. 11/345,531 assigned to the assignee of the present invention.

In the present example, the sensor cable 16 may include for each electrode (see 20 in FIG. 1) an electrode sleeve 44 disposed between longitudinal ends of segments of the jacket 30. The jacket 30 is thus longitudinally separated into segments at the longitudinal position of each electrode sleeve 44.

The electrode sleeve 44 may be made from electrically nonconductive material such as polypropylene or similar plastic and may substantially cylindrical in exterior configuration. The electrode sleeve 44 may include longitudinal end portions 44C that are configured to fit tightly within the interior of the jacket 30 at a corresponding end thereof. The electrode sleeve 44 may define a mounting surface 44A for placement of electrode material 48 thereon. The mounting surface 44A may be cylindrically or otherwise shaped and have a slightly smaller external diameter than the longitudinal end segments 44C. Having such diameter may provide the electrode (20 in FIG. 1), which is formed by applying the material 48 onto the mounting surface 44A, with an external diameter substantially the same as that of the jacket 30, so as to reduce friction of the cable 16 as it is towed in the water (11 in FIG. 1) and to improve the ability of the sensor cable 16 to be retracted onto a winch or reel (not shown) by maintaining a substantially constant external diameter thereof. The electrode sleeve 44 may define one or more internal passages 44B to enable through passage of the strength members 42 and the harness 40. In some examples, the internal passages 44B may be configured to enable adhesive or other bonding of the electrode sleeve 44 to the strength members 42 so that the longitudinal position of the electrode sleeve 44 is maintained. Such will be shown in more detail in and explained with reference to FIG. 3.

Longitudinal ends of the mounting surface 44A may include thereon an electrical contact layer 46 preferably made from silver, gold, platinum or other precious metal to provide an electrical connection between the electrode material 48 and electrical conductors in the harness 40. Precious metal may be preferred for electrical conductivity and corrosion resistance. The electrode material 48 is generally disposed onto the mounting surface 44A and at the longitudinal ends contacts and covers at least art of the contact layer 46. The electrode material 48 may be affixed to the contact layer 46 such as by external clamping (not shown).

In some examples, the electrode material 48 may be fiber woven into a braided cloth sleeve, wherein the fiber is an electrically conductive material such as carbon fiber or graphite fiber, or for example, carbon nanotubes grown on a surface or even directly on the mounting surface 44A and/or the contact layer 46. In other examples, a plurality of individual carbon or graphite fibers may be wound around the mounting surface 44A and clamped at the longitudinal ends onto the contact layer 46. By providing such a configuration of the contact layer 46 and fibers, the electrode material 48 may make good electrical contact between the harness 40 and substantially all the fibers in the material 48. The configuration explained above may minimize electrical resistance between the harness 40 and any portion of any of the fibers in the electrode material 48. Devices for making electrical connection between the contact layer 46 and electrical conductors in the harness may include making a small opening or passage for a wire through the wall of the sleeve 44, and after disposing a wire therein, sealing the opening, for example, with room temperature vulcanizing rubber sealant or similar material.

Figure 3:
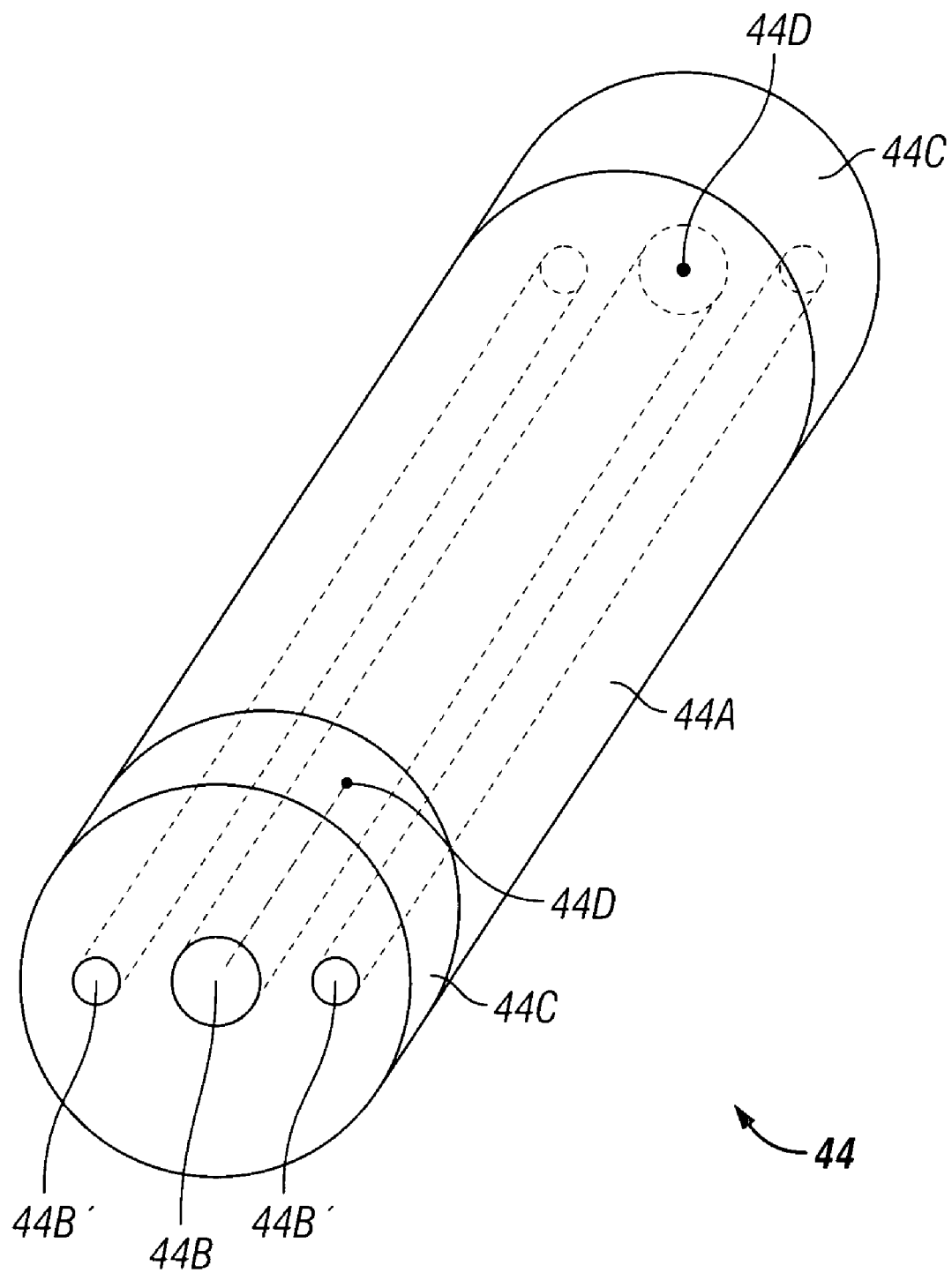
FIG. 3 shows an example of an electrode sleeve in more detail.

FIG. 3 shows an example of an electrode sleeve in more detail. The sleeve 44 is shown in oblique view so that passages for the harness (40 in FIG. 2) shown at 44B and for the strength members (42 in FIG. 2) shown at 44B can be observed extending from one longitudinal end to the other of the sleeve 44. An opening 44D in the longitudinal ends 44C may provide passage for a wire (see FIG. 2) that may be used to electrically connect the contact layer (46 in FIG. 2) to the harness (40 in FIG. 2). Such openings 44D may extend laterally from the longitudinal end surface 44C to the interior of the passage 44B for the harness (40 in FIG. 2). An electrode sleeve configured according to the example shown in FIG. 3 may provide fluid sealed internal passages for routing the harness (40 in FIG. 2) and the strength members (42 in FIG. 2) such that the void fill material can be inserted in the interior of the jacket (30 in FIG. 2) at one end of the sensor cable and can be moved therein to the other end of the sensor cable as is the usual manner of making a seismic sensor streamer known in the art.

A marine electromagnetic survey cable made according to the invention may provide greater reliability and greater ease of manufacture and maintenance than other types of cables used for marine electromagnetic surveying.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electromagnetic sensor cable, comprising:
   at least one strength member configured to be coupled to a vessel for towing in a body of water and extending along the length of the cable;
   a jacket covering the strength member and extending along the length of the cable;
   at least one electrode mounting sleeve disposed along the jacket and coupled at its longitudinal ends to one end of a segment of the jacket, the longitudinal ends of the sleeve configured to mate with a corresponding end of the jacket segment, the sleeve including a passage therethrough for the at least one strength member, the sleeve including a mounting surface for a fiber electrode material thereon disposed between the longitudinal ends of the sleeve;
   at least one electrical contact surface disposed on the mounting surface; and
   electrically conductive fiber electrode material disposed on the mounting surface and in electrical contact with the electrical contact surface.

2. The cable of claim 1 wherein the electrode material comprises braided carbon fiber.

3. The cable of claim 1 wherein the electrode material comprises wound carbon fiber.

4. The cable of claim 1 wherein the electrical contact surface comprises a layer of precious metal.

5. The cable of claim 1 further comprising at least one buoyancy spacer disposed within the jacket.

6. The cable of claim 1 further comprising at least one seismic sensor disposed in a sensor spacer inside the jacket.

7. The cable of claim 1 further comprising a void fill material disposed inside the jacket.

8. The cable of claim 7 wherein the void fill material comprises at least one of oil and gel.

9. The cable of claim 1 further comprising a wire harness disposed inside the jacket and extending along the length of the cable, the harness including at least one electrical conductor electrically connected to the electrode material.

10. The cable of claim 1 wherein the jacket comprises polyurethane.

11. The cable of claim 1 further comprising an electrical contact surface disposed at each longitudinal end of the mounting surface, and wherein the electrode material is coupled to the contact surface at each longitudinal end of the mounting surface.

12. An electromagnetic sensor cable, comprising:

at least one strength member configured to be coupled to a vessel for towing in a body of water and extending along the length of the cable;

a jacket covering the strength member and extending along the length of the cable;

a plurality of electrode mounting sleeves disposed at spaced apart locations along the jacket and each coupled at longitudinal ends thereof to one end of a segment of the jacket, the longitudinal ends of each sleeve configured to mate with a corresponding end of the jacket segment, each sleeve including a passage therethrough for the at least one strength member, each sleeve including a mounting surface for a fiber electrode material thereon disposed between the longitudinal ends of each sleeve;

at least one electrical contact surface disposed on the mounting surface of each sleeve; and electrically conductive fiber electrode material disposed on the mounting surface of each sleeve and in electrical contact with the electrical contact surface of each sleeve.

13. The cable of claim 12 wherein the electrode material comprises braided carbon fiber.

14. The cable of claim 12 wherein the electrode material comprises wound carbon fiber.

15. The cable of claim 12 wherein the electrical contact surface comprises a layer of precious metal.

16. The cable of claim 12 further comprising a plurality of buoyancy spacers disposed within the jacket at spaced apart locations.

17. The cable of claim 12 further comprising a plurality of seismic sensors each disposed in a respective sensor spacer, the sensor spacers disposed at spaced apart locations along and inside the jacket.

18. The cable of claim 12 further comprising a void fill material disposed inside the jacket.

19. The cable of claim 18 wherein the void fill material comprises at least one of oil and gel.

20. The cable of claim 12 further comprising a wire harness disposed inside the jacket and extending along the length of the cable, the harness including at least one electrical conductor electrically connected to the electrode material of each electrode.

21. The cable of claim 12 wherein the jacket comprises polyurethane.

22. The cable of claim 1 further comprising an electrical contact surface disposed at each longitudinal end of the mounting surface of each sleeve, and wherein the electrode material is coupled to the contact surface at each longitudinal end of the mounting surface of each sleeve.

* * * * *